United States Patent
Uemura et al.

(10) Patent No.: US 11,434,990 B2
(45) Date of Patent: Sep. 6, 2022

(54) VEHICLE SHIFT DEVICE WITH LATERAL AND LONGITUDINAL MOTION

(71) Applicant: MAZDA MOTOR CORPORATION, Hiroshima (JP)

(72) Inventors: Hiroki Uemura, Aki-gun (JP); Yoshito Hirata, Aki-gun (JP); Tomonori Ohtsubo, Aki-gun (JP); Masanori Taguchi, Aki-gun (JP); Kouji Tokunaga, Aki-gun (JP); Akira Michinaga, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 7 days.

(21) Appl. No.: 16/951,694

(22) Filed: Nov. 18, 2020

(65) Prior Publication Data
US 2021/0199193 A1    Jul. 1, 2021

(30) Foreign Application Priority Data
Dec. 25, 2019   (JP) .............................. JP2019-234257

(51) Int. Cl.
*F16H 59/10* (2006.01)
*F16H 59/02* (2006.01)
*F16H 61/02* (2006.01)

(52) U.S. Cl.
CPC ......... *F16H 59/10* (2013.01); *F16H 59/0278* (2013.01); *F16H 61/0204* (2013.01)

(58) Field of Classification Search
CPC ........ Y10T 74/20201; Y10T 74/20159; B60K 20/04; B60K 2370/87; B60K 2370/654;
(Continued)

(56) References Cited

U.S. PATENT DOCUMENTS

| 4,991,460 A * | 2/1991 | Shirahama | .............. F16H 59/10 74/473.33 |
| 2001/0047694 A1 * | 12/2001 | Yokawa | .................. F16H 59/10 74/473.21 |

(Continued)

FOREIGN PATENT DOCUMENTS

| EP | 0331797 A2 * | 9/1989 | ......... F16H 59/0204 |
| EP | 1335155 A2 * | 8/2003 | ............. F16H 59/10 |

(Continued)

*Primary Examiner* — Jake Cook
*Assistant Examiner* — T. Scott Fix
(74) *Attorney, Agent, or Firm* — Studebaker & Brackett PC (57) ABSTRACT

A shift device comprises a shift lever and a shift knob. A driver moves the shift knob in a longitudinal direction when a shift change is conducted between plural traveling positions. The driver moves the shift knob, in a lateral direction, toward a driver's side when the shift change is conducted from a R position to a P position. When viewed from a vehicle rear side, the shift lever located at the traveling positions takes a first position where the shift lever is inclined, relative to its upright state, in a direction of separating its upper end portion with the shift knob from a driver's seat, whereas the shift lever located at the P position takes a second position where the shift lever is in the upright state or in a state which is closer to the upright state than the first position.

17 Claims, 10 Drawing Sheets

(58) Field of Classification Search
CPC ....... B60K 2370/774; F16H 2059/0239; F16H 59/0278; F16H 59/10; F16H 61/0204; B60N 2/797; B60N 2/793; B60N 2/79; B60N 2/78; B60N 2/75; B60N 2/01
USPC ................. 74/473.21, 473.32, 473.33, 473.3
See application file for complete search history.

(56) References Cited

U.S. PATENT DOCUMENTS

| | | | | |
|---|---|---|---|---|
| 2004/0035237 | A1* | 2/2004 | Matsui | F16H 59/105 |
| | | | | 74/473.12 |
| 2007/0138819 | A1* | 6/2007 | Akimoto | B60R 7/04 |
| | | | | 296/37.8 |
| 2008/0264194 | A1* | 10/2008 | Bowman | F16H 59/0204 |
| | | | | 74/473.18 |
| 2010/0307276 | A1* | 12/2010 | Giefer | F16H 61/24 |
| | | | | 74/473.3 |
| 2012/0144949 | A1* | 6/2012 | Kim | F16H 59/105 |
| | | | | 74/473.33 |
| 2015/0101439 | A1* | 4/2015 | Lee | F16H 59/0204 |
| | | | | 74/473.33 |
| 2019/0072177 | A1 | 3/2019 | Tokumo et al. | |
| 2019/0136963 | A1* | 5/2019 | Hong | F16H 59/0204 |

FOREIGN PATENT DOCUMENTS

| | | | | |
|---|---|---|---|---|
| JP | 2019-043466 A | | 3/2019 | |
| WO | WO-0004307 A2 * | | 1/2000 | ........... F16H 59/044 |
| WO | WO-2016042949 A1 * | | 3/2016 | ......... F16H 59/0204 |

\* cited by examiner

VEHICLE SHIFT DEVICE WITH LATERAL AND LONGITUDINAL MOTION

BACKGROUND OF THE INVENTION

The present invention relates to a shift device for a vehicle.

Japanese Patent Laid-Open Publication No. 2019-43466 (US 2019/0072177 A1) discloses a stationary type of electrical shift device (shift-by-wire type of shift device) as an example of the shift device for the vehicle. In the stationary type of electrical shift device, even if a driver releases a hand from a shift knob after a driver's shift operation, a shift lever is held at a shift position to which the shift lever has been operated, differently from a momentary type of electrical shift device, so that the driver can recognize a current shift position directly without looking at an indicator or the like.

Further, the electrical shift device disclosed in the above-described patent document is configured such that the shift knob is moved in a vehicle longitudinal direction in order to change the shift position among an R (reverse) position, an N (neutral) position, and a D (drive) position, whereas the shift knob is moved in the vehicle lateral direction in order to change the shift position between the R position and a P (parking) position. Thereby, a size of the device disclosed in the above-described patent document can be made properly compact, compared to a case where the shift positions of P-R-N-D are arranged in line in the vehicle longitudinal direction.

Meanwhile, it is required to use a structure of the vehicle in which the safety can be secured during the vehicle driving by further reducing fatigue of the driver. Therefore, there seems to be room for improvement in this regard, i.e., in reduction of the driver's fatigue, for the above-described device disclosed in the patent document as well.

Herein, even for a type of shift device which is linked with a transmission via a cable, there is room for improvement similarly to the above-described electrical shift device.

SUMMARY OF THE INVENTION

The present invention has been devised in view of the above-described matter, and an object of the present invention is to provide a shift device for a vehicle which can properly reduce the fatigue of the driver during the vehicle driving.

The present invention is a shift device for a vehicle which is provided at a side portion beside a driver's seat, comprising a shift lever provided to stand extending upwardly from a lower part of the side portion, and a shift knob attached to an upper end portion of the shift lever, where an operational force is inputted during a shift operation by a driver, wherein in a case where a moving locus of the upper end portion of the shift lever when a shift change by the shift lever is conducted between plural traveling positions including a drive position is defined so as to correspond to a first shift lane and another moving locus of the upper end portion of the shift lever when another shift change by the shift lever is conducted between one of the plural traveling positions and a parking position is defined so as to correspond to a second shift lane, the first shift lane extends in a vehicle longitudinal direction, whereas the second shift lane extends in a vehicle lateral direction such that the second shift lane approaches the driver's seat from the first shift lane, and when viewed from one side of the vehicle longitudinal direction, the shift lever located at the traveling positions takes a first position where the shift lever is inclined, relative to an upright state thereof, in a direction of separating the upper end portion from the driver's seat, whereas the shift lever located at the parking position takes a second position where the shift lever is in the upright state or in a state which is closer to the upright state than the first position.

According to the present invention, since the shift lever is inclined in the direction of separating the upper end portion of the shift lever from the driver's seat (the shift lever takes the first position) when the upper end portion (where the shift knob is attached) of the shift lever is positioned in the first shift lane which corresponds to the moving locus of the upper end portion of the shift lever when the shift change is conducted between the plural traveling positions (e.g., the reverse, neural, and drive positions), the fatigue of driver's arm can be properly reduced during the vehicle driving. That is, while the driver moves the driver's hand longitudinally when changing the plural traveling positions, this shift operation (changing) can be lightly (smoothly) conducted by the driver without applying strength with the hand because of the shift lever inclined.

In an embodiment of the present invention, when viewed from one side of a vehicle vertical direction, the plural traveling positions and the parking position are respectively located at separated positions from each other, and in a case where the shift lever takes a specified position, the specified position taken by the shift lever is maintained until the shift operation by the driver is conducted newly.

Since the so-called stationary type of shift device which is configured, like this embodiment, such that the specified position taken by the shift lever is maintained (held) until the shift operation by the driver is conducted newly is used, the driver can recognize the current shift position directly without looking at the indicator or the like. Thus, this embodiment is effective in securing the higher safety of the vehicle.

In another embodiment of the present invention, the plural traveling positions include a reverse position and a neutral position additionally to the drive position, the reverse position, the neutral position, and the drive position are arranged in order from a front side of the vehicle longitudinal direction in the first shift lane, and the above-described one of the plural traveling positions is the reverse position.

In a case where the reverse position is provided at a front end portion of the first shift lane and the second shift lane is configured to extend in the lateral direction from the reverse position provided at the front end portion of the first shift lane as described above, the driver who wants to conduct the shift operation along the first shift lane up to the reverse position can push the shift lever forwardly until the shift knob moves to the front end portion of the first shift lane. Accordingly, when the shift position is changed to the reverse position from the neutral position or the like, there does not occur any situation where the shift lever has been shifted to the parking position, passing through the reverse position, so that it is unnecessary for the driver to apply strength with the hand in the rearward direction unlike a shift pattern where the parking position, the reverse position, the neutral position, and the drive position are arranged in line in the vehicle longitudinal direction. Thus, the fatigue of the driver's arm can be further properly reduced during the shift operation.

Herein, even when the shift lever is shifted from the parking position to the reverse position, the shift knob of the shift lever can be simply moved, in the lateral direction, up to an end portion of the second shift lane. Therefore, there is not any concern that the shift lever may be mistakenly shifted to the neutral position or the drive position. Thus, the fatigue of the driver's arm can be reduced during the shift operation from the parking position to the reverse position as well.

In another embodiment of the present invention, when viewed from the one side of the vehicle longitudinal direction, an angle formed between the shift lever taking the first position and the shift lever taking the second position is 10 degrees or greater.

According to this embodiment, since the shift lever is inclined in an opposite direction to the driver's seat by the 10 degrees or greater, this is particularly effective to reduce the fatigue of the driver's arm during the vehicle traveling. That is, while the driver primarily use respective muscles of the driver's shoulder and arm for moving the hand in the longitudinal direction when conducting the shift operation along the first shift lane extending in the longitudinal direction, it is unnecessary for the diver to use the muscle of the arm too much by configuring the shift lever to be inclined in the opposite direction to the driver's seat by the 10 degrees or greater. Thus, this embodiment is effective in further properly reducing the fatigue of the driver's arm during the vehicle driving.

In another embodiment of the present invention, the shift lever taking the second position is in the upright state.

According to this embodiment, the driver who have conducted the shift operation to the parking position can intuitively recognize that the shift lever is securely located at the parking position. That is, in a case where the shift lever taking the second position is not upright but inclined, it may be difficult to intuitively recognize whether the shift lever is located at the parking position or not according to an inclination degree of the shift lever. According to this embodiment, however, since the shift lever taking the second position is in the upright state, it should be easy for the driver to intuitively recognize that the shift lever is located at the parking position.

Herein, the meaning of the above-described "upright" should be construed on the basis of a relative position to the floor of the vehicle.

In another embodiment of the present invention, an passenger seat is provided to be spaced apart from the driver's seat in the vehicle lateral direction, the shift device for the vehicle is provided between the driver's seat and the passenger seat, and an inclination angle of the shift lever taking the first position is set such that the shift knob of the shift lever is positioned more closely to the driver's seat than the passenger seat.

According to this embodiment, since an upper limit of the inclination angle of the shift lever taking the first position is controlled as described above, it is prevented that the driver's shift operation improperly touches (contacts with) a hand of a passenger seated in the passenger seat, thereby securing comfortability of the driver and the passenger.

In another embodiment of the present invention, an passenger seat is provided to be spaced apart from the driver's seat in the vehicle lateral direction, a center console is provided between the driver's seat and the passenger seat, the shift lever is provided such that the upper end portion thereof extends upwardly beyond an upper face portion of the center console, and an inclination angle of the shift lever taking the first position is set such that a specified gap is secured between the shift knob and the center console.

According to this embodiment, since an upper limit of the inclination angle of the shift lever taking the first position is controlled as described above, a situation where a little finger of the like of the driver is improperly caught between the shift knob and the center console during the shift operation is possibly avoided. Thus, any uncomfortable situation described above or any trouble for the driver's shift operation are prevented from happening, so that the comfortability of the driver or the driving safety can be secured properly.

In another embodiment of the present invention, the shift device for the vehicle is a shift-by-wire type of electrical shift device and further comprises a boxy shift-device base which stores a rotational center of the shift lever therein, the shift-device base is inserted into an inside part of the center console, and a space is generated between a part of a bottom section of a portion of the center console where the shift-device base is inserted and the above-described floor part.

According to this embodiment, since the space is generated between the part of the bottom section of the center console (the bottom section of the portion where the shift-device base is inserted) and the above-described floor part, it is effective that the passenger or others are forced to recognize that the shift-by-wire type of electrical shift device is applied. Further, this embodiment is effective in improving the flexibility of cabin designing of the vehicle as well.

In another embodiment of the present invention, the shift knob has an upper face portion which expands in directions substantially perpendicular to an extension direction of the shift lever, and the upper face portion of the shift knob is a surface where a hand of the driver is put when the driver conducts the shift operation.

According to this embodiment, since the upper face portion of the shift knob is configured to expand in the directions substantially perpendicular to the extension direction of the shift lever, the driver who conducts changing of the traveling position puts the hand on the upper face portion of the shift knob in a state where a thumb side of the hand is slightly raised relative to the horizontal. Thereby, the fatigue of the muscle of the arm (particularly, a muscle of a forearm) can be properly reduced, compared to a case where the hand is put in a horizontal attitude. This is because an ulna and a radius of the forearm are so twisted when the driver makes the hand horizontal that a strain is given on the muscles around these two bones. However, since this embodiment is configured such that the thumb side of the hand is slightly raised relative to the horizontal when the driver who conducts changing of the traveling position puts the hand on the upper face portion of the shift knob, the driver can keep a natural attitude where substantially no strain is given on the muscles around the above-described two bones of the forehand.

The present invention will become apparent from the following description which refers to the accompanying drawings.

DETAILED DESCRIPTION OF THE INVENTION

Hereafter, an embodiment of the present invention will be described referring to the drawings. The embodiment described below exemplifies just one example of the present invention, and the present invention should not be limited to this, except its substantial structures.

1] Structure of Inside of Cabin of Vehicle

Figure 1:
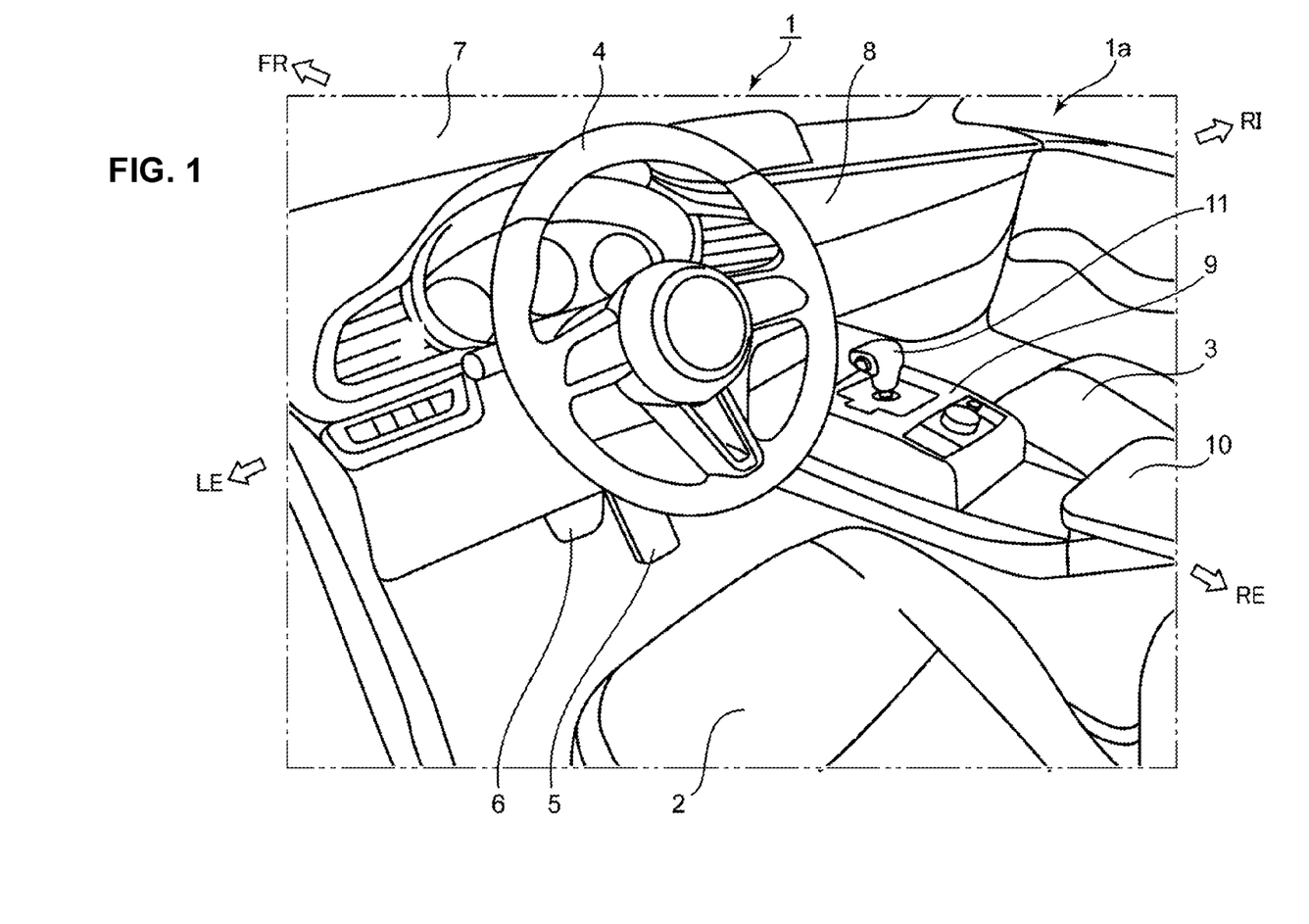
FIG. 1 is a perspective view showing a structure of an inside of a cabin of a vehicle according to an embodiment.

FIG. 1 is a perspective view showing a structure of an inside of a cabin 1a of a vehicle 1 according to the present embodiment. The drawings of the present embodiment schematically show various structures, and a size or the like shown in each figure may be different from the actual size or the like. In the figures, indications of "UP," "LO," "FR," "RE," "LE," and "RI" mean respective directions of "upper," "lower," front, ""rear," "left," and "right" which are recognized by a driver seated in a driver's seat.

As shown in FIG. 1, a driver's seat 2 and an passenger seat 3 are arranged side by side, in a lateral direction, in the cabin 1a of the vehicle 1 according to the present embodiment. A space is generated, in the lateral direction, between the driver's seat 2 and an passenger seat 3. Herein, the present embodiment exemplifies a so-called left-handle vehicle 1 in which the driver's seat 2 is disposed on a left side and the passenger seat 3 is disposed on a right side.

A steering wheel 4 is provided in front of the driver's seat 2. The steering wheel 4 is located at a level (height position) around a driver's chest when the driver is seated in the driver's seat 2. Further, in front of the driver's seat 2 are disposed an accelerator (acceleration pedal) 5 and a brake pedal 6 at a floor portion. The accelerator 5 is arranged at a position where a right foot of the driver seated in the driver's seat 2 is put, and the brake pedal 6 is arranged on the left side of the accelerator 5.

A windshield (front window) 7 is provided at a front portion of the cabin 1a. The windshield 7 is made of laminated glass, for example. An instrument panel 8 is provided in an area from a lower end portion of the windshield 7 to a front side of the steering wheel 4. The instrument panel 8 is provided to extend, in a vehicle width direction, from a front side of the driver's seat to a front side of the passenger seat 3. The instrument panel 8 includes a meter cluster portion and the like which are located in front of the steering wheel 4.

A center console 9 and an armrest 10 are arranged on a floor between the driver's seat 2 and the passenger seat 3. Various input devises regarding driving operations, such as a shift device 11 for the vehicle, are disposed at the center console 9. The armrest 10 is arranged on a rear side of the center console 9, which is a place where an elbow of a forearm of a passenger seated in the driver's seat 2 or the passenger seat 3 is placed.

2] Structure of External Appearance of Shift Device for Vehicle

Figure 2:
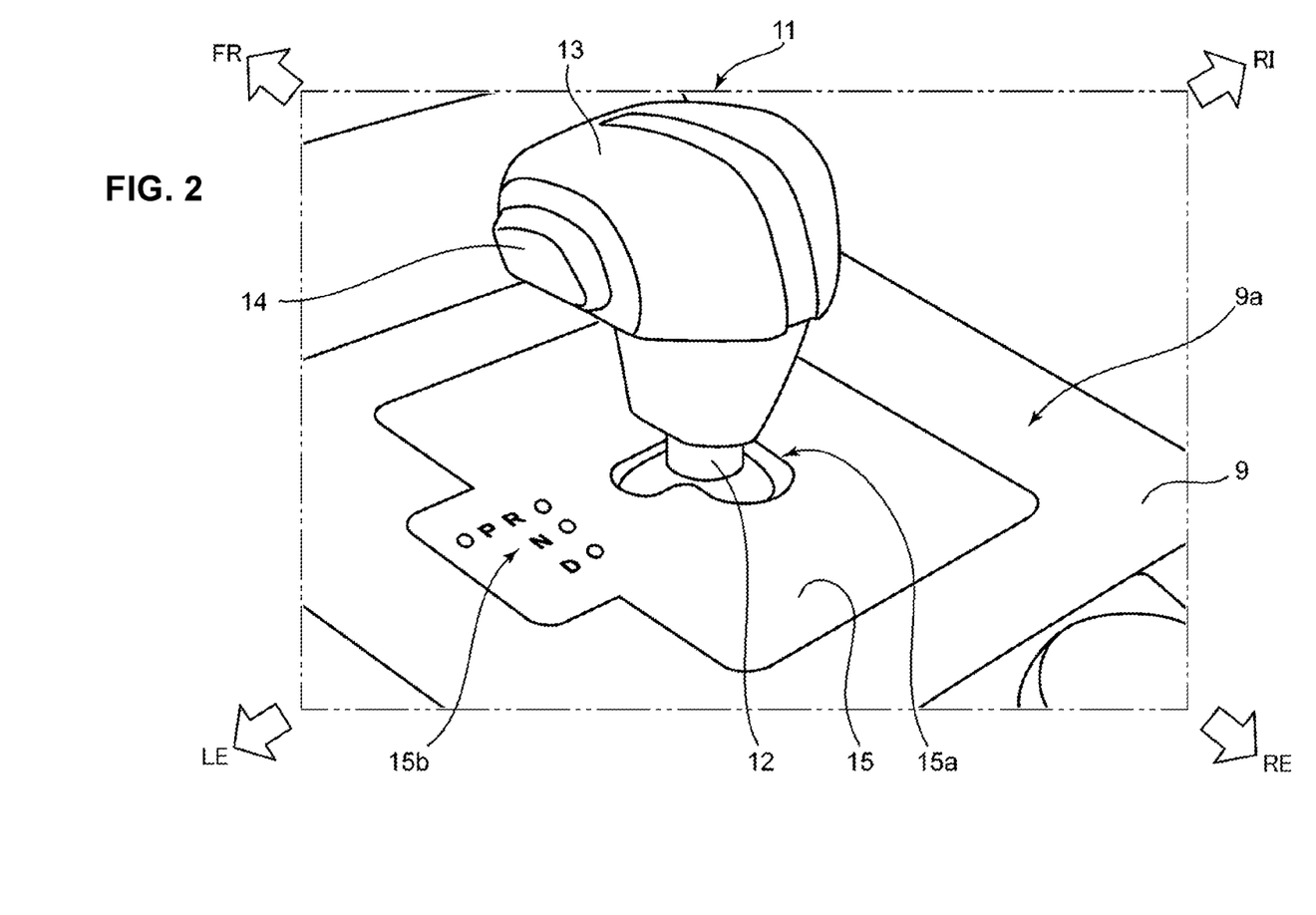
FIG. 2 is a perspective view showing a structure of external appearance of a shift device for the vehicle.

FIG. 2 is a perspective view showing a structure of external appearance of the shift device 11 for the vehicle 1 according to the present embodiment.

As shown in FIG. 2, the shift device 11 comprises a shift-device base 15 which is inserted into an inside part of the center console 9 such that its surface is located substantially at the same level of an upper face portion 9a of the center console 9, a shift lever 12 which is provided to stand upwardly from inside of the shift-device base 15 in an upright state, and a shift knob 13 which is attached to an upper end portion of the shift lever 12. Further, a push switch 14 to receive an operation by a thumb of the driver is arranged at a left-side portion of the shift knob 13.

A shift lane 15a is provided at the shift-device base 15 so as to correspond to a moving locus of the shift lever 12 operated by the driver. The vehicle 1 of the present embodiment adopts a so-called stationary type of shift device. Accordingly, when the shift lever 12 is moved to a specified position by the operation of the driver, the shift position of the shift lever 12 is maintained at this specified position until the shift operation by the driver is conducted newly.

Further, an indicator portion 15b is provided at a part of the shift-device base 15 which is located on the driver side of a place where the shift lever 12 projects. The driver can recognize the shift position through indication of the indicator 15b as well.

Herein, the shift device 11 of the present embodiment is an electrical shift device (shift-by-wire type of shift device).

3] Structure Regarding Rotation of Shift Lever

Figure 3:
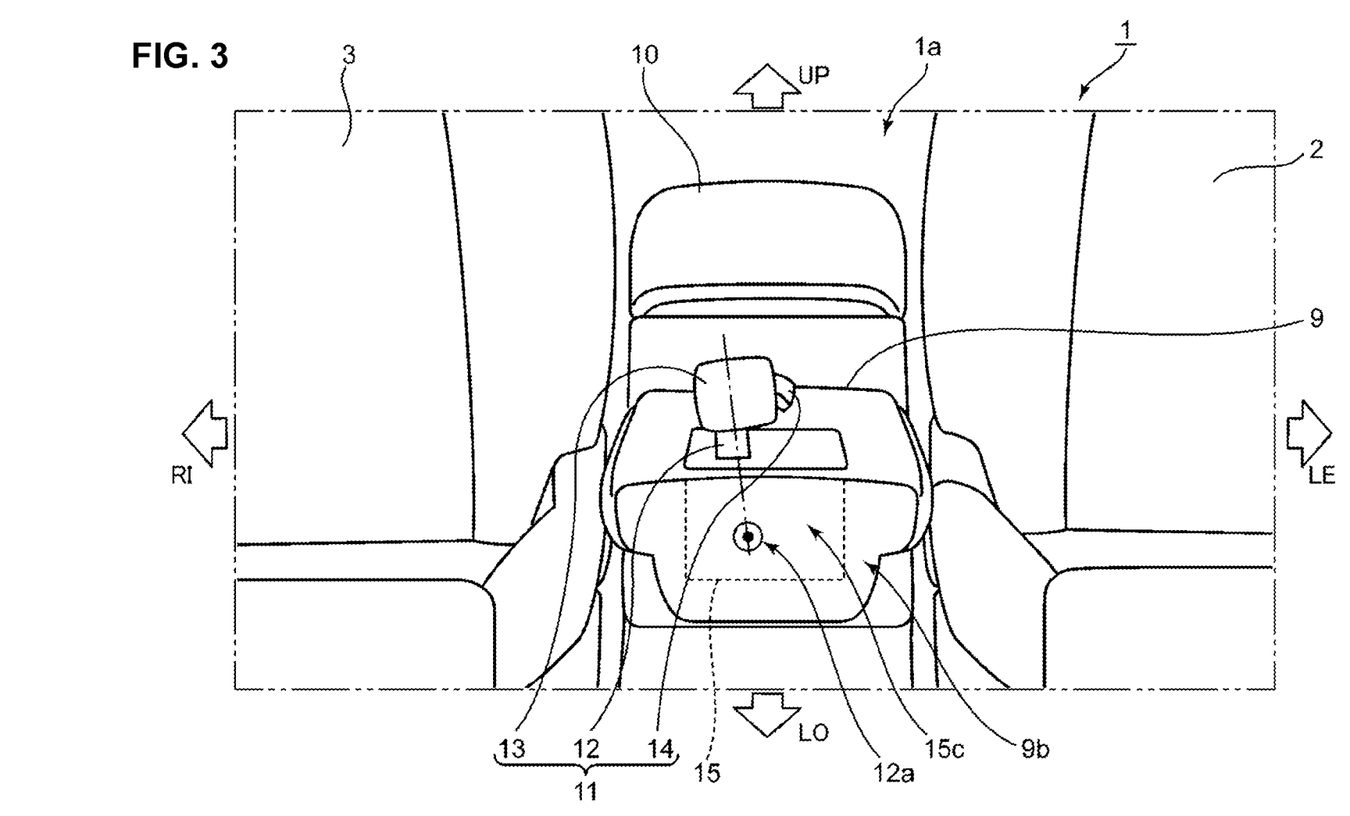
FIG. 3 is an elevational view showing a structure according to a rotation of a shift lever.

FIG. 3 is an elevational view showing a structure regarding a rotation of the shift lever 12.

As shown in FIG. 3, the shift-device base 15 of the shift device 11 is inserted into an inside part 9b of the center console 9. A size, in a vertical direction, of the shift-device base 15 is set so that the shift-device base 15 can be stored in the inside part 9b of the center console 9.

The shift lever 12 is configured to be rotatable so that the upper end portion of the shift lever 12 where the shift knob 13 is attached can be moved in the longitudinal direction and in the lateral direction by the shift operation conducted by the driver with the hand which is put on the shift knob 13. A rotational center 12a of the shift lever 12 is located at an inside part 15c of the shift-device base 15. That is, the shift device 11 of the present embodiment is a so-called short stroke type of shift device.

4] Arrangement of Shift Device at Floor

Figure 4:
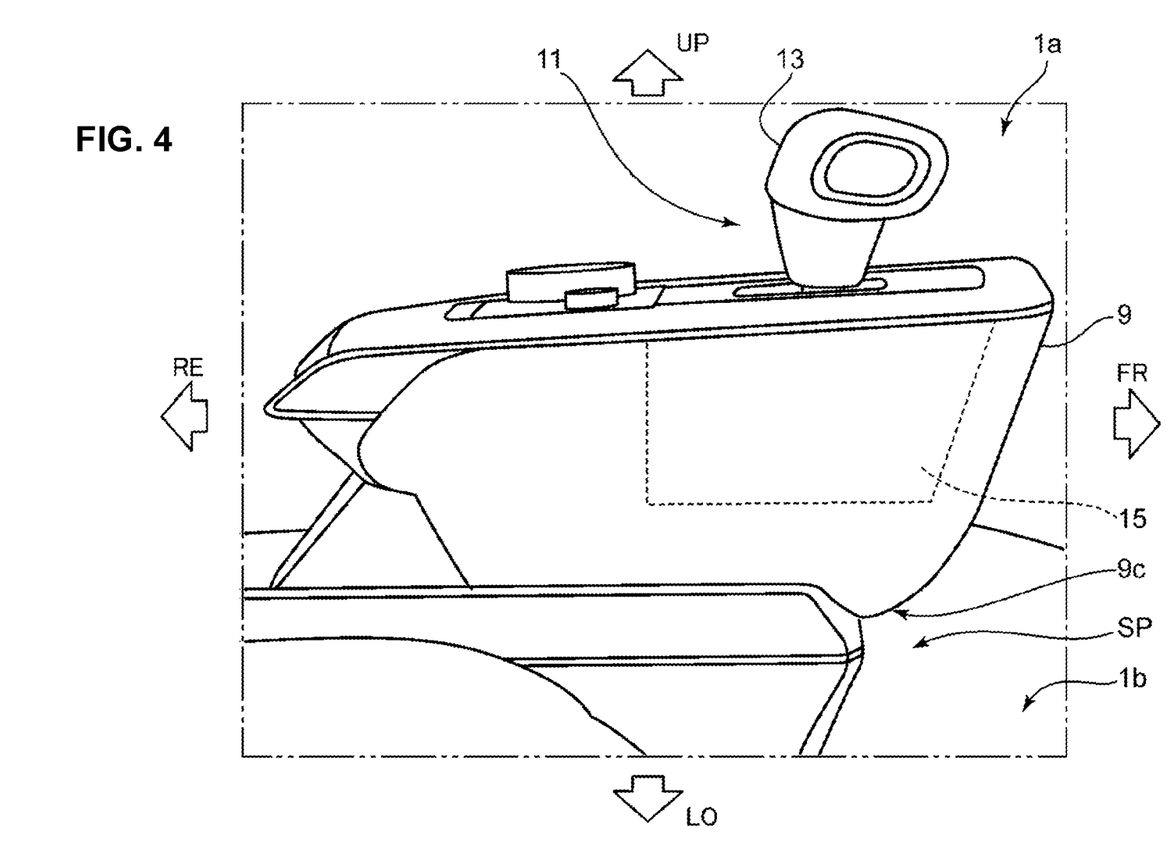
FIG. 4 is a side view of the shift device for the vehicle, when viewed from a right side.

FIG. 4 is a side view of the shift device 11, when viewed from the right side.

As shown in FIG. 4, the shift-device base 15 of the shift device 11 is inserted inside the center console 9. A space SP is generated between the floor 1b and a part of a bottom section 9c of a portion of the center console 9 where the shift-device base 15 is inserted.

In the vehicle 1 provided with the above-described shift device 11, the driver can easily recognize that the shift device 11 is the electrical shift device. Further, this is superior in the designability of the cabin 1a as well.

5] Shift Pattern

Figure 5:
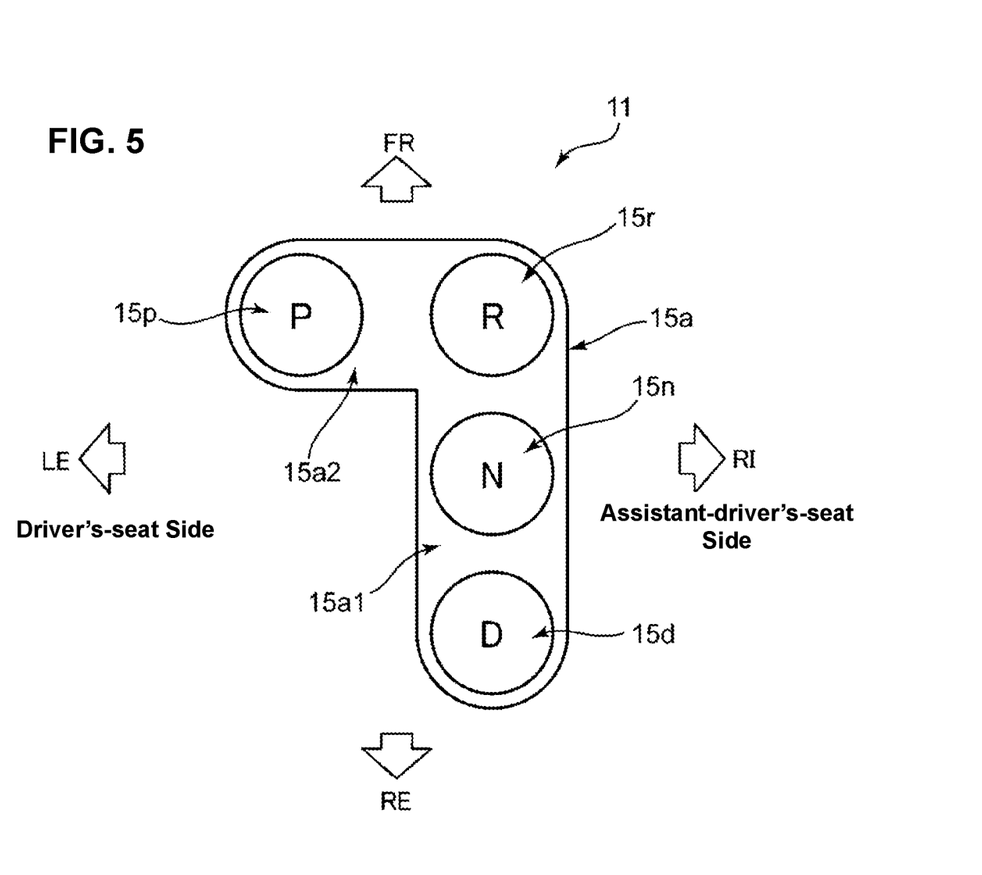
FIG. 5 is a schematic diagram showing a shift pattern of the shift device for the vehicle.

FIG. 5 is a schematic diagram showing a shift pattern of the shift device 11.

As shown in FIG. 5, the shift device 11 is configured such that a reverse (R) position 15r, a neutral (N) position 15n, and a drive (D) position 15d are arranged substantially straightly in order from the front side to the rear side. Meanwhile, a parking (P) position 15p is arranged on the left side (driver's side) of the R position 15r.

The shift lane 15a provided along the moving locus of the shift lever 12 comprises a longitudinal-direction lane 15a1 which corresponds to the moving of the shift lever 12 among the R position 15r, the N position 15n, and the D position 15d and a lateral-direction lane 15a2 which corresponds to the moving of the shift lever 12 between the R position 15r and the P position 15p. The longitudinal-direction lane 15a1 and the lateral-direction lane 15a2 are continuous to each other at the R position 15r, and the shift lane 15a is nearly inverse-L shaped as a whole.

In the present embodiment, there is a case where the R position 15r, the N position 15n, and the D position 15d are referred to as a "traveling position."

The driver conducts the shift operation described below when starting to drive the stopped (parked) vehicle 1.

First, the driver holds (grips) the shift knob 13 in a state where the brake pedal 6 is pressed, and moves it to the right with the driver's thumb, pushing the push switch 14. Thereby, the shift position is changed from the P position 15p to the R position 15r.

Next, the driver moves the shift knob 13 rearwardly, hooking the driver's middle finger or third finger on a front end portion of the shift knob 13. Thereby, the shift position is changed from the R position 15r to the N position 15n and then to the D position 15d.

Finally, the driver can drive (start) the vehicle 1 forward by pressing the accelerator 5, releasing the brake pedal 6.

Meanwhile, when the driver stops the vehicle 1 and changes the shift position to the P position 15p, the following shift operation is conducted.

First, the driver presses the bake pedal 6, releasing the accelerator 5. Thereby, the driver pushes a rear end portion of the shift knob 13 forwardly with the driver's hand after the vehicle 1 has stopped. Thereby, the shift position is changed from the D position 15d to the N position 15n.

Next, the driver presses the push switch 14, holding the shift knob 13, in a state where the brake pedal 6 is pressed, and changes the shift position from the N position 15n to the R position 15p.

Finally, the driver pushes a right-side side portion of the shift knob 13 to the left with the driver's hand, and changes the shift position from the R position 15r to the P position 15p. Then, the driver applies a parking brake.

6] Position Change of Shift Lever between P Position and Traveling Positions

Figure 6:
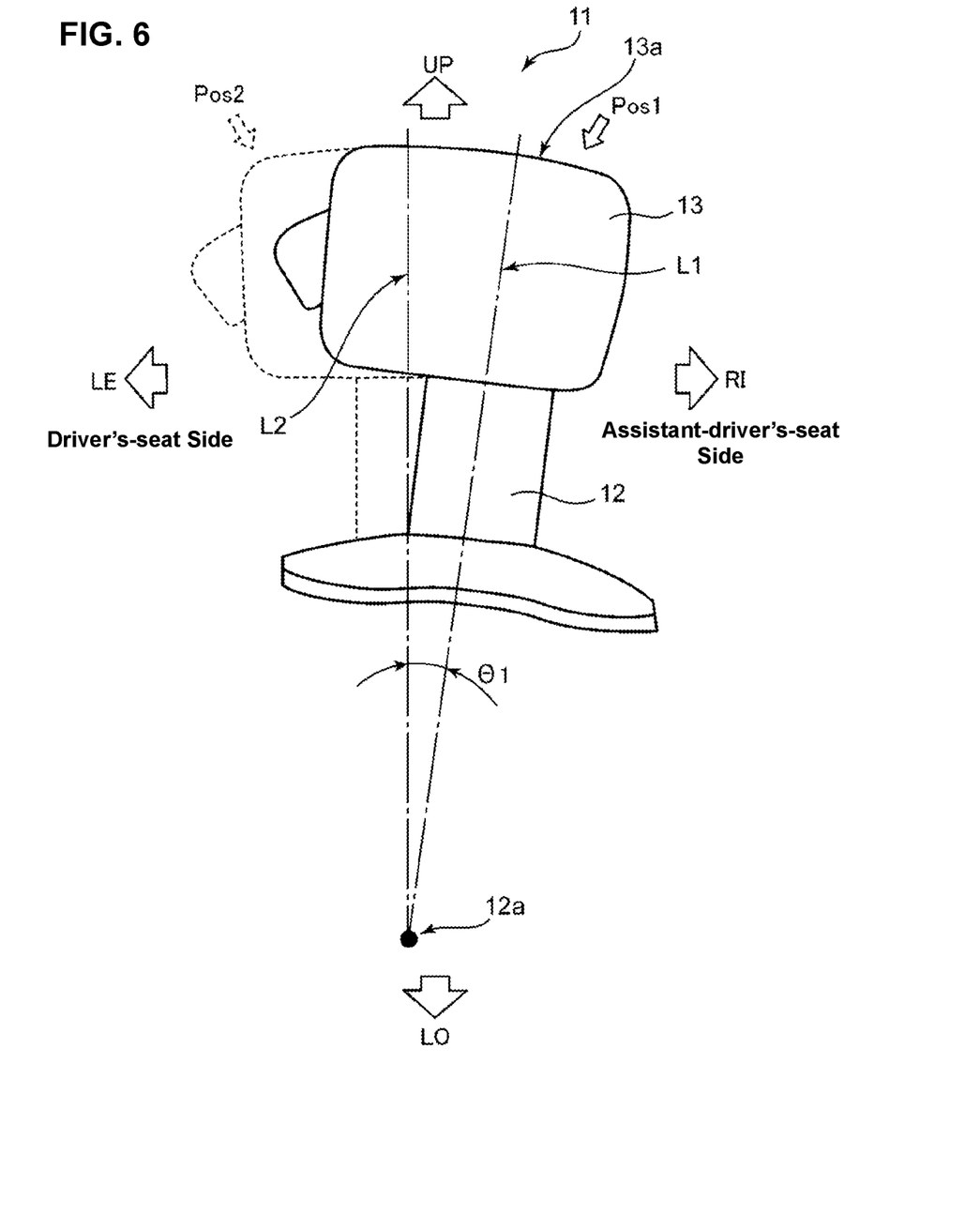
FIG. 6 is a schematic diagram showing a position change of the shift lever between a P position and a traveling position.

FIG. 6 is a schematic diagram showing the position change of the shift lever 12 between the P position 15p and the traveling positions 15r, 15n, 15d.

As shown in FIG. 6, when the shift device 11 is viewed from the rear side of the vehicle 1, the shift lever 12 takes a first position Pos1 when the shift position is the traveling positions 15r, 15n, 15d, and the shift lever 12 takes a second position Pos2 when the shift position is the P position 15p. A center line L1 of the shift lever 12 is inclined to the right (toward the assistant-driver's-seat 3' side) when the shift lever 12 takes the first position Pos1.

Meanwhile, when the shift lever 12 takes the second position Pos2, a center line L2 of the shift lever 12 is in the upright state or in a state which is closer to the upright state than the above-described center line L1. In the vehicle 1 according to the present embodiment, the center line L2 is in the upright state when the vehicle 1 stops at a horizontal place.

In the shift device 11 of the present embodiment, an angle θ1 formed between the center line L1 and the center line L2 is set to be 10 degrees or greater. Specifically, the shift device 11 of the present embodiment is configured such that the angle θ1 is 10 degrees, for example.

7] Muscles of Arm of Person (Driver)

Figure 7A:
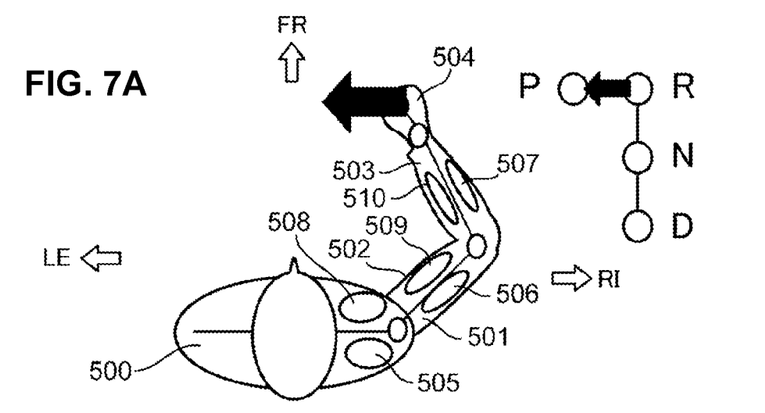
FIG. 7A is a diagram explaining muscles when the shift lever is moved in a lateral direction.
Figure 7B:
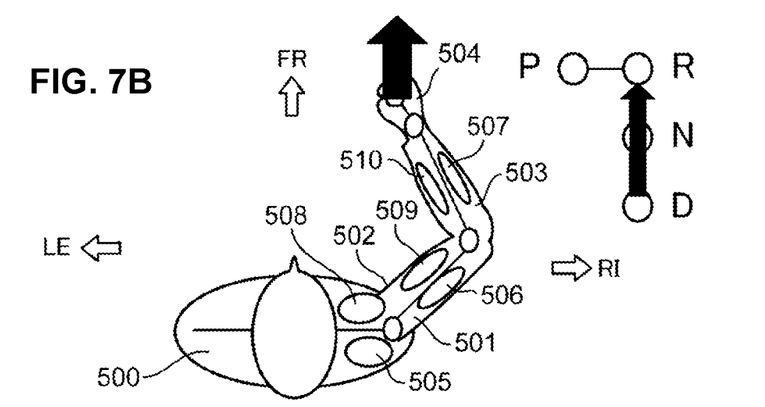
FIG. 7B is a diagram explaining the muscles when the shift lever is moved in a longitudinal direction.
Figure 7C:
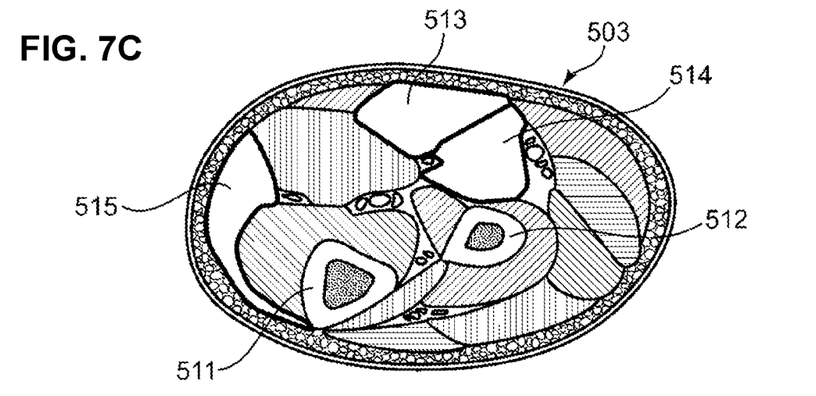
FIG. 7C is a sectional diagram representing muscles of a forearm.

FIG. 7A is a diagram explaining muscles 505-510 of an arm 501 of a person (driver) 500 when the shift lever 12 is moved in the lateral direction, FIG. 7B is a diagram explaining the muscles when the shift lever 12 is moved in the longitudinal direction, and FIG. 7C is a sectional diagram representing bones and muscles of a forearm 503.

As shown in FIG. 7A, when the shift operation is conducted from the R position 15r to the P position 15p with a hand 504 contacting with the right-side side portion of the shift knob 13, the muscle 508 of a shoulder, the muscle 509 of an upper arm 502, and the muscle 510 of the forearm 503 are used.

Meanwhile, when the shift operation is conducted from the P position 15p to the R position 15r with the hand 504 put on the shift knob 13, pushing the push switch 14, the muscle 505 of the shoulder, the muscle 506 of the upper arm 502, and the muscle 507 of the forearm 503 are used.

Herein, as shown in FIG. 7C, the forearm 503 has two bones (an ulna 511 and a radius 512), and a flexor capri radialis muscle 513, a pronator teres muscle 514, and a flexor capri ulnaris muscle 515 are provided around these bones. Herein, the flexor capri radialis muscle 513 and the pronator teres muscle 514 are the muscles to be used when the shift lever 12 is moved to the right (toward the outside of a body), and the flexor capri ulnaris muscle 515 is the muscle to be used when the shift lever 12 is moved to the left (toward the inside of the body).

Next, as shown in FIG. 7B, when the shift operation is conducted from the D position 15d to the N position 15n (forwardly) with the hand 504 contacting with the rear end portion of the shift knob 13, the shoulder's muscle 508 and the muscle 506 of the upper arm 502 are used.

Meanwhile, when the shift operation is conducted from the N position 15n to the D position 15d (rearwardly) with the middle finger, the third finger, or the like of the hand 504 which are hooked on the front end portion of the shift knob 13, the shoulder's muscle 505 and the muscle 509 of the upper arm 502 are used.

8] Fatigue of Driver in Shift Operation

Figure 8:
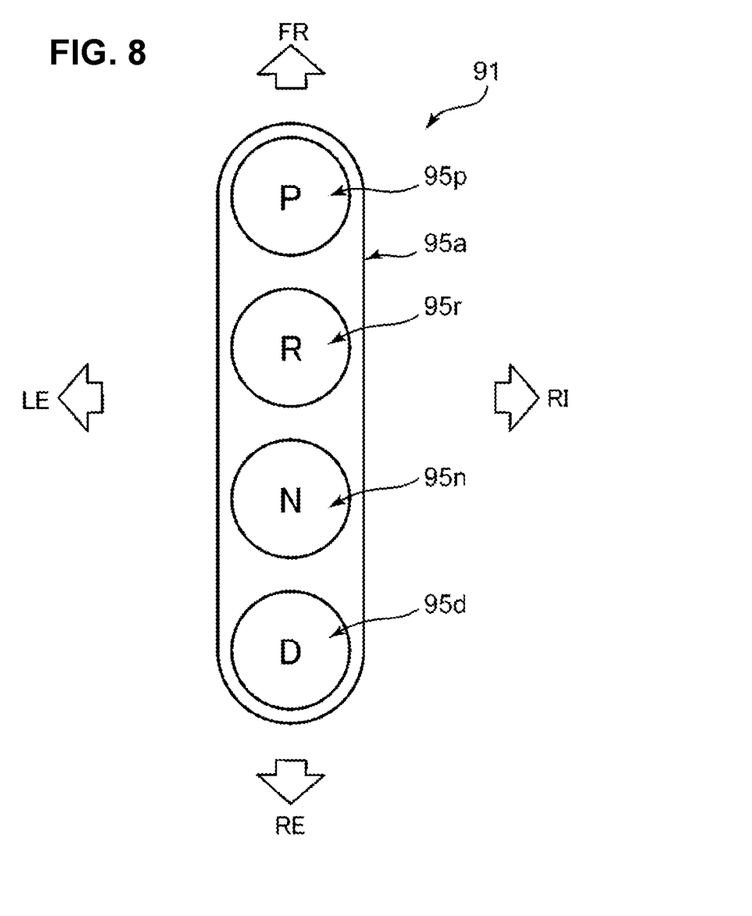
FIG. 8 is a schematic diagram showing a shift pattern of a shift device for a vehicle according to a reference example.

Fatigue of the driver in the shift operation will be described referring to FIG. 8 additionally to the above-described figures. FIG. 8 is a schematic diagram showing a shift pattern of a shift device 91 for a vehicle according to a reference example.

(1) Fatigue Reduction by Shift Pattern

As described above, the shift device 11 according to the present embodiment is configured such that the shift pattern (shift lane 15a) is of the inverse-L shape and the shift knob 13 is moved in the lateral direction in the shift operation between the P position 15p and the R position 15r.

Meanwhile, in the shift device 91 according to the reference example, a P position 95p, an R position 95r, an N position 95n, and a D position 95d are arranged in order from the front side to the rear side as shown in FIG. 8. Accordingly, the shift device 91 of the reference example is configured to have an I-shaped shift lane 95a.

When the shift operation is conducted by using the shift device 91 having the I-shaped shift lane 95a according to the reference example, the fatigue of the arm 501 seems to be relatively large, compared to the shift deice 11 having the inverse-L shaped shift lane 15a according to the present invention. That is, when the shift operation is conducted by the shift device 91 from the N position 95n to the R position 95r, the shift knob is pushed forwardly with the hand contacting with the rear end portion of the shift knob. Herein, it is necessary for the driver to apply a rearward force to the arm in the latter half of operation such that the shift lever has not reached the P position 95p, passing through the R position 95r.

Likewise, when the shift operation is conducted from the P position 95p to the R position 95r, while the shift knob is pulled rearwardly with the middle finger and the third finger of the hand hooked on the front end portion of the shift knob, it is necessary to apply a forward force to the arm in the latter half of operation such that the shift lever has not reached the N position 95n or the D position 95d, passing through the R position 95r. There is a concern that the repeated shift operation by the driver described above in the long drive or the like may cause accumulation of the fatigue.

Meanwhile, according to the shift device 11 with the inverse-L shaped shift lane 15a of the present embodiment, as shown in FIG. 5, the fatigue of the driver can be properly reduced, compared to the shift device 91 of the reference example. That is, when the shift operation is conducted from the N position 15n to the R position 15r by the shift device 11 of the present embodiment, the driver can simply push the shift knob 13 forwardly up to a front end portion of the longitudinal-direction lane 15a1 with the hand contacting with the rear end portion of the shift knob, so that it can be properly prevented that the shift lever 12 reaches the P position 15p mistakenly.

Likewise, when the shift operation is conducted from the P position 15p to the R position 15r by the shift device 11 of the present embodiment, the driver can simply move the shift knob 13 to the right up to a right end portion of the lateral-direction lane 15a2 with the thumb of the hand pushing a left-side side face of the shift knob, so that it can be properly prevented that the shift lever reaches the N position 15n and the D position 15d mistakenly. Accordingly, in the vehicle 1 provided with the shift device 11 according to the present embodiment, the fatigue reduction can be properly attained, compared to a case where a vehicle provided with the shift device 91 according to the reference example.

(2) Fatigue Reduction by Position of Shift Lever

As described above referring to FIG. 6, in the shift device 11 of the present embodiment, the shift lever 12 takes the upright second position Pos2 when being located at the P position 15p, and the shift lever 12 takes the inclined first position Pos1 when being located at the traveling position, such as the R position 15r, the N position 15n, or the D position 15d. Thereby, the fatigue of the driver's arm can be properly suppressed during the vehicle traveling.

Specifically, when the shift operation is conducted among the R position 15r, the N position 15n, and the D position 15d, the driver operates with the hand put on the upper face portion 13a of the shift knob 13. Herein, when the shift lever 12 is located at the first position Pos1, the upper face portion 13a of the shift knob 13 is inclined outwardly relative to a horizontal surface by the angle θ1, when viewed from the driver.

In general, when the hand is put on a horizontal base (rest), the person gets more relaxed in a case where the hand is inclined such that a thumb side is slightly raised and a palm of the hand is directed inwardly toward a body side than a case where the palm of the hand is positioned horizontally along the base. In other words, if the person puts the hand on the horizontal base, such as a desk, and tries to make the palm of the hand contact with a horizontal surface of the base tightly, the forearm 503 is twisted in such a manner that the ulna 511 and the radius 512 cross each other, so that the muscle of the arm 501 is used. Therefore, according to the shift device 11 of the present invention in which the upper face portion 13a of the shift knob 13 of the shift lever 12 located at the traveling positions 15r, 15n, 15p is inclined relative to the horizontal by the angle θ1, the driver can put the hand on the upper face portion 13a of the shift knob 13 with the arm 501 which is in the more relaxed state during the vehicle traveling.

Thus, the shift device 11 of the present embodiment can reduce the fatigue of the driver properly during the vehicle driving.

Figure 9A:
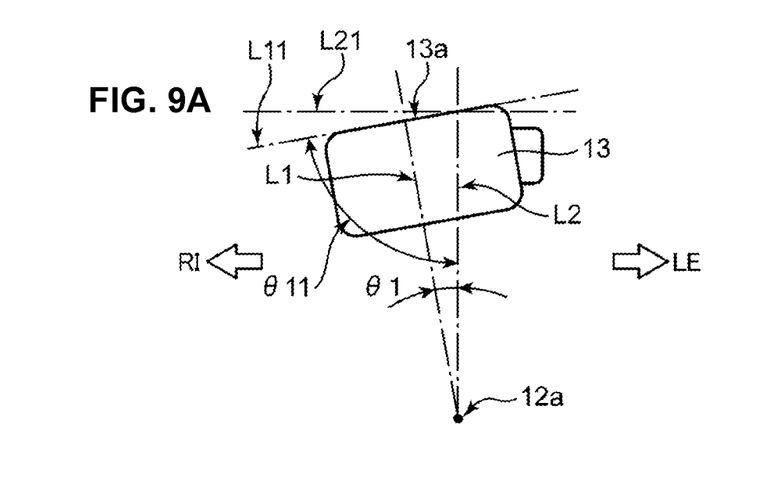
FIG. 9A is a diagram of a shift knob which takes a first position, when viewed from a front side.
Figure 9B:
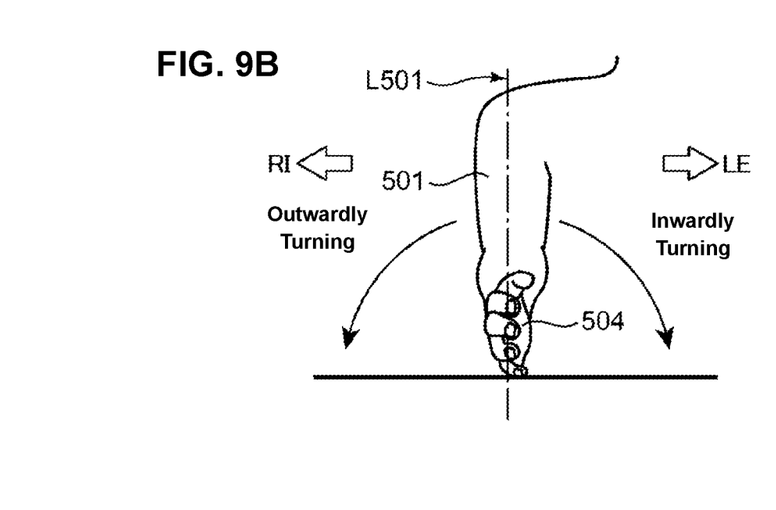
FIG. 9B is a diagram representing an arm, a hand of which is held in a vertical position.
Figure 9C:
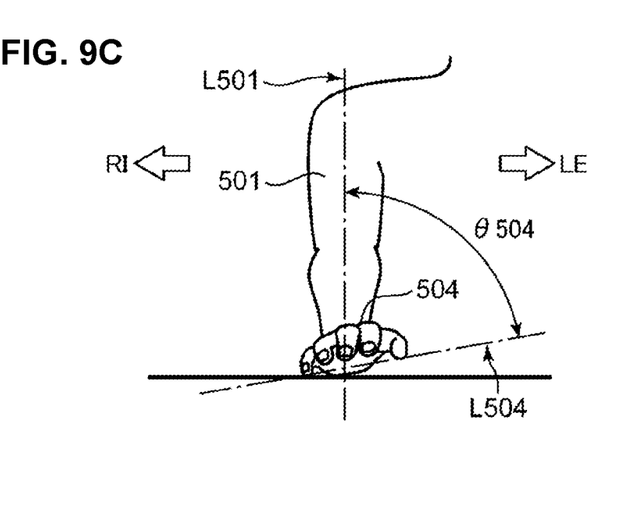
FIG. 9C is a schematic diagram showing a state where the hand is turned by a specified angle.

9] Supplementation regarding Relationships between Position of Shift Lever and Driver's Fatigue FIG. 9A is a diagram of the shift knob 13 which takes the first position Pos1, when viewed from the front side, FIG. 9B is a diagram representing the arm, the hand 504 of which is held in the vertical position, and FIG. 9C is a schematic diagram showing a state where the hand 504 is turned by a specified angle (θ504).

First, as shown in FIG. 9A, the center line L1 of the shift lever 12 tanking the first position Pos1 as described above is inclined relative to the center line L2 of the shift lever 12 taking the second position Pos2 by the angle θ1. Accordingly, a tangential line L11 which tangents to the upper face portion 13a when the shift lever 12 takes the first position Pos1 is inclined, by the angle θ1, relative to a tangential line L21 which tangents to the upper face portion 13a when the shift lever 12 takes the second position Pos2. The tangential line L11 when the shift lever 12 takes the first position Pos1 is inclined, by an angle θ11, relative to the center line L2 of the shift lever 12 when the shift lever 12 takes the second position Pos2. In the present embodiment, the angle θ11 is set to be (90 degrees-θ1).

"The Japanese Journal of Rehabilitation Medicine Vol. 53 No. 10 2016, pp. 758-761; Kunihiro Oka" has the discerption about the "three dimensional movement of the elbow joint" of "The elbow joint can have the forearm rotational movement at the humeroulnar joint, the humeroradial joint, and the proximal radioulnar joint. It is necessary that the range of motion of the elbow joint is the bending 30—130°, the inwardly turning 80°, and the outwardly turning 80° in order to ensure a normal daily life having the motion arrange of the elbow joint of the stretch 0—10°, the bending 140—150°, the inwardly turning 85°, and the outwardly turning 90°."

As shown in FIG. 9B, the inwardly-turning angle and the outwardly-turning angle are defined on the basis of a center line L501 of the forearm 501 in a state where the hand 504 is upright. As shown in FIG. 9C, when an imaginary line L504 is drawn along the hand 504 inwardly turned, an angle θ504 between the above-described center line L501 and the imaginary line L504 is the above-described inwardly turning 80°.

Thus, based on the above-described view, according to the present embodiment, the angle θ11 is set to be 80 degrees or smaller, and the angle θ1 of the shift lever 12 taking the first position Pos1 is set to be 10 degrees or larger. Herein, as described above, the angle θ1 is set at 10 degrees as an example in the present embodiment.

Herein, considering a body-size difference or an individual difference of the driver, the angle θ504 may be set at 82 degrees. Accordingly, the angle θ11 can be set to be 82 degrees or smaller, and the angle θ1 of the shift lever 12 taking the first position Pos1 can be set to be 8 degrees or larger.

10] Upper Limit of Inclination Angle of Shift Lever at Traveling Positions

Figure 10A:
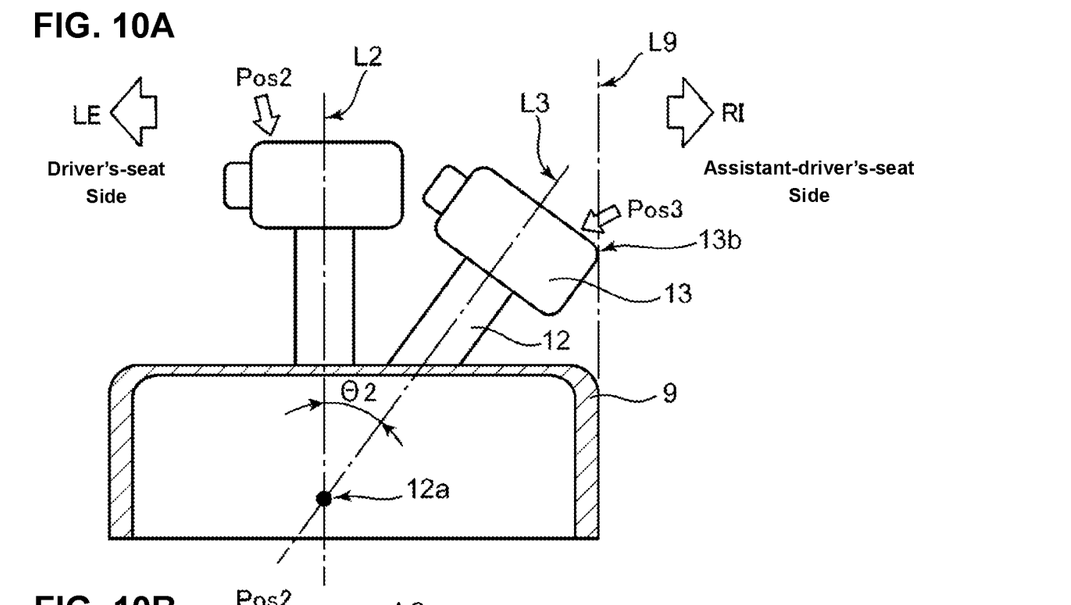
FIG. 10A is a schematic diagram showing a first example where an upper limit of an inclination angle of the shift lever located at a traveling position is controlled.
Figure 10B:
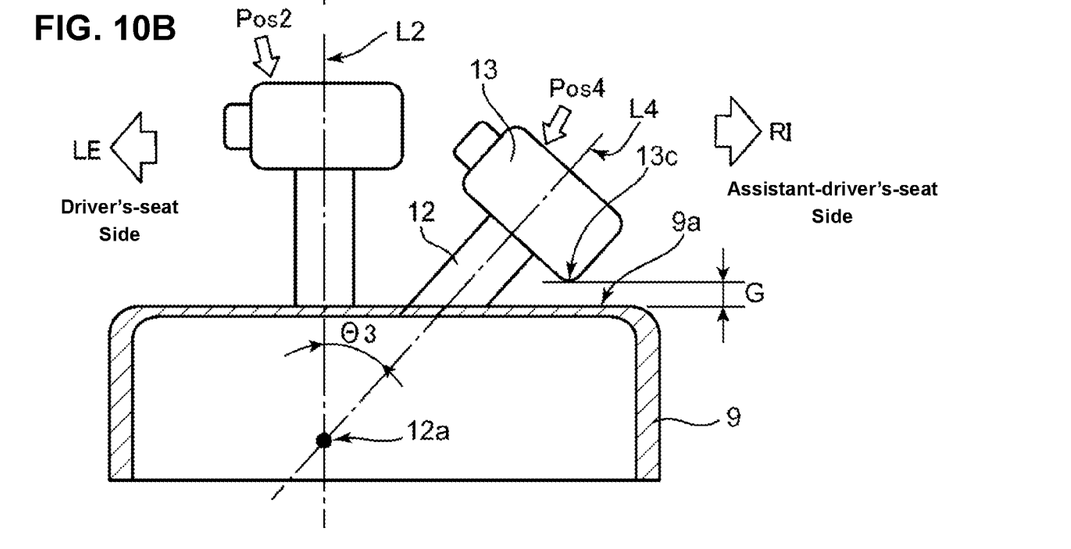
FIG. 10B is a schematic diagram showing a second example where the upper limit of the inclination angle of the shift lever located at the traveling position is controlled.

FIG. 10A is a schematic diagram showing a first example where an upper limit of an inclination angle of the shift lever 12 located at the traveling positions 15r, 15n, 15d is controlled, and FIG. 10B is a schematic diagram showing a second example where the upper limit of the inclination angle of the shift lever located at the traveling positions 15r, 15n, 15d is controlled.

(1) FIRST EXAMPLE

As shown in FIG. 10A, in the first example, the shift knob 13 controls an inclination-angle upper limit θ2 of the shift lever 12 based on the position of a right end L9 of the center console 9. Specifically, the angle (upper limit) θ2 between the center lines L2, L3 of the shift lever 12 is controlled as an angle of the shift lever 12 located at a position Pos3 where a right-side upper end portion 13b of the shift knob 13 matches the right end L9 of the center console 9.

By controlling the inclination-angle upper limit θ2 of the shift lever 12 as described above, the shift knob 13 is prevented from protruding toward the side of the passenger seat 3 even if the vehicle travels with the traveling positions 15r, 15n, 15d of the shift position, so that the passenger seated in the passenger seat can feel comfortable.

(2) SECOND EXAMPLE

As shown in FIG. 10B, in the second example, an inclination-angle upper limit θ3 of the shift lever 12 is controlled so that a gap G can be generated between the shift knob 13 and the upper face portion 9a of the center console 9. Specifically, the angle (upper limit) θ3 between the center lines L2, L4 of the shift lever 12 is controlled as an angle of the shift lever 12 located at a position Pos4 where the gap G is generated between a right-side lower end portion 13c of the shift knob 13 and the upper face portion 9a of the center console 9. Herein, the above-described gap G is set to be greater than the thickness of a little finger of a large body-sized person (driver).

By controlling the inclination-angle upper limit θ3 of the shift lever 12 as described above, the driver can be prevented from getting the finger caught between the shift knob 13 and the center console 9 even if the vehicle travels with the traveling positions 15r, 15n, 15d of the shift position.

[Modifications]

While the above-described embodiment exemplifies the left-handle vehicle 1, the present invention is applicable to a right-handle vehicle as well. In this case, the same effects as the above-described embodiment can be obtained just by making right-and-left relationships opposite.

While the above-described embodiment adopts the stationary type of shift device 11, the present invention can adopt a momentary type of shift device as well. In this case, the same effects as the above-described embodiment can be obtained just by configuring the shift lever located at the traveling position to be inclined by a specified angle relative to the shift lever located at the parking position.

While the above-described embodiment is configured such that the traveling position has three positions of the R position, the N position, and the D position, the present invention is applicable to a vehicle provided with the traveling position which has four or more positions including the R position, the N position, and the D position as well. For example, a S position, a B position, or the like may be provided.

While the above-described embodiment adopts the short-stroke type of shift device 11 in which the shift lever 12 is relatively short, the present invention is applicable to a long-stroke type of shift device in which the shift lever is relatively long as well.

While the above-described embodiment is configured such that the space SP is generated between the floor 1b and the part of the bottom section 9c of the portion of the center console 9 where the shift-device base 15 is inserted, the present invention does not necessarily require that a space is generated at this part.

While the above-described embodiment is configured such that the push switch 14 is provided at the left-side portion (driver's-side side face portion) of the shift knob 13, the present invention should not be limited to this regarding the arrangement of the push switch. For example, the push switch may be provided at a front face portion, an front part of the upper face portion, or the like of the shift knob.

While the above-described embodiment is configured such that the indicator portion 15b is provided at the shift-device base 15 of the shift device 11, the present invention should not be limited to this regarding the arrangement of the indicator portion. For example, the indicator portion may be provided at a meter cluster panel, an instrument panel, or the like.

What is claimed is:

1. A shift device for a vehicle which is provided at a side portion beside a driver's seat, comprising:
a shift lever provided to stand extending upwardly from a lower part of the side portion; and
a shift knob attached to an upper end portion of the shift lever, where an operational force is inputted during a shift operation by a driver,
wherein a first shift lane corresponds to a moving locus of the upper end portion of said shift lever when a shift change by the shift lever is conducted between all of plural traveling positions including a drive position, and a second shift lane corresponds to another moving locus of the upper end portion of said shift lever when another shift change by the shift lever is conducted only between one of the plural traveling positions and a parking position, said first shift lane extends in a vehicle longitudinal direction, and said second shift lane extends in a vehicle lateral direction such that the second shift lane approaches the driver's seat from the first shift lane,
when viewed from one side of the vehicle longitudinal direction, said shift lever located at any one of the plural traveling positions takes a first position where the shift lever is inclined, relative to an upright state thereof where the shift lever is substantially vertical when the vehicle is substantially horizontal, in a direction of separating the upper end portion from the driver's seat, whereas said shift lever located at the parking position takes a second position where the shift lever is in the upright state or in a state which is closer to the upright state than said first position,
when viewed from the one side of the vehicle longitudinal direction, an angle formed between said shift lever taking said first position and said shift lever taking said second position is less than 90 degrees, said shift knob has an upper face portion which expands in directions substantially perpendicular to an extension direction of said shift lever, and said upper face portion of the shift knob is a surface where a hand of the driver is put when the driver conducts the shift operation, and a push switch is disposed at the driver's-side side face portion of the shift knob.

2. The shift device for the vehicle of claim 1, wherein when viewed from one side of a vehicle vertical direction, said plural traveling positions and said parking position are respectively located at separated positions from each other, and in a case where said shift lever takes a specified position, said specified position taken by the shift lever is maintained until the driver conducts a new shift operation.

3. The shift device for the vehicle of claim 2, wherein said plural traveling positions include a reverse position and a neutral position in addition to the drive position; the reverse position, the neutral position, and the drive position are arranged in order from a front side of the vehicle longitudinal direction in said first shift lane; and said one of the plural traveling positions is the reverse position.

4. The shift device for the vehicle of claim 3, wherein when viewed from the one side of the vehicle longitudinal direction, an angle formed between said shift lever taking said first position and said shift lever taking said second position is 10 degrees or greater.

5. The shift device for the vehicle of claim 4, wherein said shift lever located at the parking position takes the second position where the shift lever is in the upright state.

6. The shift device for the vehicle of claim 5, wherein a passenger seat is provided to be spaced apart from the driver's seat in the vehicle lateral direction, said shift device for the vehicle is provided between the driver's seat and the passenger seat, and an inclination angle of said shift lever taking said first position is set such that said shift knob of the shift lever is positioned more closely to the passenger seat than the driver's seat.

7. The shift device for the vehicle of claim 5, wherein a passenger seat is provided to be spaced apart from the driver's seat in the vehicle lateral direction, a center console is provided between the driver's seat and the passenger seat, said shift lever is provided such that the upper end portion thereof extends upwardly beyond an upper face portion of said center console, and an inclination angle of the shift lever taking said first position is set such that a specified gap is secured between said shift knob and said center console.

8. The shift device for the vehicle of claim 7, wherein said shift device for the vehicle is a shift-by-wire type of electrical shift device and further comprises a shift-device base which stores a rotational center of said shift lever therein, said shift-device base is disposed in a bottom section of said center console, and a space is generated between the bottom section of the center console and a floor of the vehicle.

9. The shift device for the vehicle of claim 1, wherein said plural traveling positions include a reverse position and a neutral position in addition to the drive position; the reverse position, the neutral position, and the drive position are arranged in order from a front side of the vehicle longitudinal direction in said first shift lane; and said one of the plural traveling positions is the reverse position.

10. The shift device for the vehicle of claim 1, wherein when viewed from the one side of the vehicle longitudinal direction, an angle formed between said shift lever taking said first position and said shift lever taking said second position is 10 degrees or greater.

11. The shift device for the vehicle of claim 1, wherein said shift lever located in the parking position takes the second position where the shift lever is in the upright state.

12. The shift device for the vehicle of claim 1, wherein a passenger seat is provided to be spaced apart from the driver's seat in the vehicle lateral direction, said shift device for the vehicle is provided between the driver's seat and the passenger seat, and an inclination angle of said shift lever taking said first position is set such that said shift knob of the shift lever is positioned more closely to the passenger seat than the driver's seat.

13. The shift device for the vehicle of claim 1, wherein a passenger seat is provided to be spaced apart from the driver's seat in the vehicle lateral direction, a center console is provided between the driver's seat and the passenger seat, said shift lever is provided such that the upper end portion thereof extends upwardly beyond an upper face portion of said center console, and an inclination angle of the shift lever taking said first position is set such that a specified gap is secured between said shift knob and said center console.

14. The shift device for the vehicle of claim 2, wherein a passenger seat is provided to be spaced apart from the driver's seat in the vehicle lateral direction, said shift device for the vehicle is provided between the driver's seat and the passenger seat, and an inclination angle of said shift lever taking said first position is set such that said shift knob of the shift lever is positioned more closely to the passenger seat than the driver's seat.

15. The shift device for the vehicle of claim 2, wherein a passenger seat is provided to be spaced apart from the driver's seat in the vehicle lateral direction, a center console is provided between the driver's seat and the passenger seat, said shift lever is provided such that the upper end portion thereof extends upwardly beyond an upper face portion of said center console, and an inclination angle of the shift lever taking said first position is set such that a specified gap is secured between said shift knob and said center console.

16. The shift device for the vehicle of claim 12, wherein a center console is provided between the driver's seat and the passenger seat, said shift lever is provided such that the upper end portion thereof extends upwardly beyond an upper face portion of said center console, and an inclination angle of the shift lever taking said first position is set such that a specified gap is secured between said shift knob and said center console.

17. The shift device for the vehicle of claim 13, wherein said shift device for the vehicle is a shift-by-wire type of electrical shift device and further comprises a shift-device base which stores a rotational center of said shift lever therein, said shift-device base is disposed in a bottom section of said center console, and a space is generated between the bottom section of the center console and a floor of the vehicle.

* * * * *